(12) United States Patent
Wei

(10) Patent No.: US 10,581,700 B2
(45) Date of Patent: Mar. 3, 2020

(54) SERVICE FLOW PROCESSING METHOD, APPARATUS, AND DEVICE

(71) Applicant: HUAWEI TECHNOLOGIES CO., LTD., Shenzhen (CN)

(72) Inventor: Xinpeng Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 484 days.

(21) Appl. No.: 15/381,759

(22) Filed: Dec. 16, 2016

(65) Prior Publication Data
US 2017/0099194 A1 Apr. 6, 2017

Related U.S. Application Data

(63) Continuation of application No. PCT/CN2014/080060, filed on Jun. 17, 2014.

(51) Int. Cl.
*G06F 15/173* (2006.01)
*H04L 12/24* (2006.01)
*H04L 29/08* (2006.01)

(52) U.S. Cl.
CPC .......... *H04L 41/50* (2013.01); *H04L 41/5041* (2013.01); *H04L 41/5051* (2013.01); *H04L 41/5058* (2013.01); *H04L 67/1002* (2013.01)

(58) Field of Classification Search
USPC ................. 709/226, 223, 224, 202
See application file for complete search history.

(56) References Cited

U.S. PATENT DOCUMENTS

| | | | |
|---|---|---|---|
| 9,258,742 B1* | 2/2016 | Pianigiani | H04L 67/327 |
| 2007/0198667 A1 | 8/2007 | Behrendt et al. | |
| 2011/0055845 A1 | 3/2011 | Nandagopal et al. | |
| 2012/0281540 A1 | 11/2012 | Khan et al. | |
| 2012/0290695 A1 | 11/2012 | Barabash et al. | |
| 2015/0103827 A1* | 4/2015 | Quinn | H04L 45/74 370/392 |
| 2015/0263901 A1* | 9/2015 | Kumar | H04L 41/12 370/254 |
| 2016/0308981 A1* | 10/2016 | Cortes Gomez | H04L 67/16 |

FOREIGN PATENT DOCUMENTS

| | | |
|---|---|---|
| CN | 102780758 A | 11/2012 |
| JP | 2009-524860 | 7/2009 |

OTHER PUBLICATIONS

S. Nadas, Ed., "Virtual Router Redundancy Protocol (VRRP) Version 3 for IPv4 and IPv6," Internet Engineering Task Force (IETF), Request for comments (RFC): 5798, Mar. 2010, 40 pgs.
(Continued)

*Primary Examiner* — Lan Dai T Truong
(74) *Attorney, Agent, or Firm* — Staas & Halsey LLP

(57) ABSTRACT

Embodiments of the present application provide a service flow processing method, an apparatus, and a device. In the embodiments of the present application, SFs are classified, and a specific instance is not selected for a stateless SF, which can effectively reduce a quantity of SFPs and a quantity of SFP IDs used to uniquely identify the SFPs, reduce signaling overheads required by a controller to configure an SFP for an SFF, and reduce storage space of each SFF for storing configuration information.

12 Claims, 6 Drawing Sheets

---

Receive a service chain service request message for a traffic flow, where the service chain service request message includes a match rule corresponding to the traffic flow and a service chain SFC required by the traffic flow, and the service chain includes multiple sequentially arranged network service functions SFs  ∼101

Separately generate, according to the multiple SFs, corresponding SFP elements used to form a service chain instance SFP corresponding to the SFC, and allocate a corresponding identifier SFP ID to the generated SFP, where if it is determined and learned that the multiple SFs include a stateless SF, an SFP element corresponding to the stateless SF is an element of a service function type  ∼102

Send the SFP and the SFP ID to each service forwarding device SFF, so that the SFF processes, according to the SFP element, a traffic flow including the SFP ID  ∼103

(56) References Cited

OTHER PUBLICATIONS

P. Lei et al., "An Overview of Reliable Server Pooling Protocols," Network Working Group, Request for Comments (RFC): 5351, Sep. 2008, 15 pgs.
European Office Action dated Mar. 27, 2018, in corresponding European Patent Application No. 14 897 135.1, 14 pgs.
Japanese Office Action dated Mar. 6, 2018, in corresponding Japanese Patent Application No. 2016-573955, 9 pgs.
Dunbar et al., "Framework for Service Function Instances Restoration", Network Working Group, IETF Trust, Apr. 29, 2014, pp. 1-12.
Zong et al., "Virtualized Network Function (VNF) Pool Problem Statement", Network Working Group, IETF Trust, May 5, 2014, pp. 1-14.
Quinn et al., "Service Function Chaining (SFC) Architecture", Network Working Group, IETF Trust, May 5, 2014, pp. 1-31.
Krishnan et al., "SFC Long-lived Flow Use Cases", SFC Working Group, IETF Trust, Apr. 21, 2014, pp. 1-10.
Jiang et al., "An Architecture of Service Function Chaining" Internet Working Group, IETF Trust, Feb. 14, 2014, pp. 1-12.
Extended European Search Report dated Mar. 30, 2017 in corresponding European Patent Application No. 14897135.1.
International Search Report dated Mar. 24, 2015 in corresponding International Patent Application No. PCT/CN2014/080060.
International Search Report dated Mar. 24, 2015 in corresponding International Application No. PCT/CN2014/080060.

\* cited by examiner

SERVICE FLOW PROCESSING METHOD, APPARATUS, AND DEVICE

CROSS-REFERENCE TO RELATED APPLICATIONS

This application is a continuation of International Application No. PCT/CN2014/080060, filed on Jun. 17, 2014, the disclosure of which is hereby incorporated by reference in its entirety.

TECHNICAL FIELD

Embodiments of the present application relate to the communications technologies, and in particular, to a service flow processing method, an apparatus, and a device.

BACKGROUND

Various network service functions (SF), for example, a TCP accelerator, a firewall, and a video accelerator, that can process a network service flow are generally deployed in an operator network, these SFs are deployed at fixed locations (statically deployed at a location in a network topology) by an operator, and when passing through the network, the network service flow successively passes through the SFs in the network according to an operator configuration. When each SF is deployed in a network in the foregoing static manner, after deployment of the SF is completed, a location of the SF in the network does not change. As a result, regardless of how to process network service flows, all the network service flows need to pass through all SFs one time, and a processing sequence thereof is unique, which cannot meet a function that the network service flows need to pass through the SFs in different sequences. For the problem, a network standardization organization puts forward the concept of a service function chain (SFC).

In an architecture in which an existing network implements an SFC function, main function entities include: an SFC controller, various SF instances sfs (that is, a specific instance of an SF, for example, a specific firewall device sf1), a classifier, a service forwarding device, and an underlying network forwarding device (for example, a layer 3 router or a layer 2 exchange). After the SFC Controller receives a service chain service request message (service chain request), if there is a specific instance SFP of an SFC that can be used, the SFP includes each specific sf providing an SFC function, and each sf has low load, the SFC Controller selects the SFP to provide a network service to a requested network service flow. In this case, the SFC Controller needs to add a match rule in the request message to a match rule corresponding to an SFP ID in the classifier, and the SFC Controller may also select a corresponding SF instance according to a requested SF in the service chain request message, and then generate a new SFP, and allocate a new SFP ID to the SFP. In a process of selecting an SF instance, if a same SF has multiple available instances, the SFC Controller selects an SF instance having low load from the multiple SF instances.

Because multiple specific instances sfs may be deployed for one SF in an actual network deployment, according to an existing technical solution, to implement load balancing, the SFC Controller selects any sf corresponding to an SF. If existence of a large quantity of sfs leads to existence of a large quantity of SFPs, in this case, the SFC Controller is responsible for allocating a unique SFP ID to each SFP, a corresponding service forwarding device SFF needs to store a forwarding entry corresponding to each SFP ID, and therefore, a large quantity of signaling is required to configure SFP information on the SFF, large signaling overheads are required, the corresponding SFF needs to maintain a large quantity of forwarding entries and needs large storage space, and forwarding efficiency is low.

SUMMARY

Embodiments of the present application provide a service flow processing method, an apparatus, and a device, so as to resolve a prior-art problem that in a process in which an SFC controller configures SFP information on an SFF, required signaling overheads are large, and accordingly, the SFF needs to maintain a large quantity of forwarding entries.

According to a first aspect, an embodiment of the present application provides a service flow processing method, including:

receiving a service chain service request message for a service flow, where the service chain service request message includes a match rule corresponding to the service flow and a service chain SFC required by the service flow, and the service chain includes multiple sequentially arranged network service functions SFs;

separately generating, according to the multiple SFs, corresponding SFP elements used to form a service chain instance SFP corresponding to the SFC, and allocating a corresponding identifier SFP ID to the generated SFP, where if it is determined and learned that the multiple SFs include a stateless SF, an SFP element corresponding to the stateless SF is an element of a service function type; and sending the SFP and the SFP ID to each service forwarding device SFF, so that the SFF processes, according to the SFP element, a service flow including the SFP ID, where that the SFF processes, according to the SFP element, the service flow including the SFP ID includes: selecting, by the SFF, a network service function instance for the SFP element that belongs to the service function type, to process the service flow.

With reference to the first aspect, in a first possible implementation manner of the first aspect, the separately generating, according to the multiple SFs, corresponding SFP elements used to form a service chain instance SFP corresponding to the SFC further includes:

if it is determined and learned that the multiple SFs include a stateful SF, selecting a network service function instance as an SFP element corresponding to the stateful SF.

With reference to the first possible implementation manner of the first aspect, in a second possible implementation manner of the first aspect, that the SFF processes, according to the SFP element, the service flow including the SFP ID further includes:

sending, by the SFF, the service flow to the network service function instance corresponding to the SFP element for processing.

With reference to the first or the second possible implementation manner of the first aspect, in a third possible implementation manner of the first aspect, the selecting a network service function instance as an SFP element corresponding to the stateful SF includes:

selecting a network service function instance whose load meets a preset condition as the SFP element corresponding to the stateful SF.

With reference to the first aspect, in a fourth possible implementation manner of the first aspect, the selecting, by the SFF, a network service function instance for the SFP element that belongs to the service function service flow type, to process the service flow includes:

selecting, by the SFF, a network service function instance whose load meets a preset condition for the SFP element that belongs to the service function service flow type, to process the service flow.

With reference to the fourth possible implementation manner of the first aspect, in a fifth possible implementation manner of the first aspect, the selecting, by the SFF, a network service function instance whose load meets a preset condition for the SFP element that belongs to the service function service flow type, to process the service flow includes:

in network service function instances corresponding to SFP elements that belong to the service function type, selecting, by the SFF, the network service function instance whose load meets the preset condition for the SFP element that belongs to the service function service flow type, to process the service flow.

With reference to the fifth possible implementation manner of the first aspect, in a sixth possible implementation manner of the first aspect, the selecting, by the SFF, the network service function instance whose load meets the preset condition for the SFP element that belongs to the service function service flow type, to process the service flow further includes:

in network service function instances that are directly connected to the SFF and that correspond to the SFP elements that belong to the service function type, selecting, by the SFF, the network service function instance whose load meets the preset condition for the SFP element that belongs to the service function service flow type, to process the service flow.

With reference to any one of the third to the sixth possible implementation manners of the first aspect, in a seventh possible implementation manner of the first aspect, the selecting a network service function instance whose load meets a preset condition is specifically:

selecting a network service function instance whose load is less than a threshold, or selecting a network service function instance whose load meets a service requirement.

According to a second aspect, an embodiment of the present application provides a service flow processing method, including:

receiving a service chain instance SFP and a corresponding identifier SFP ID that are sent by a controller, where the SFP is generated by the controller according to a service chain SFC required by a service flow, the controller allocates the corresponding identifier SFP ID to the generated SFP, the SFP includes multiple SFP elements, and the SFP elements are separately generated by the controller according to multiple sequentially arranged network service functions SFs included in the SFC; and processing, according to the SFP element, the service flow including the SFP ID, where the processing, according to the SFP element, the service flow including the SFP ID includes:
selecting a network service function instance for the SFP element that belongs to a service function service flow type, to process the service flow.

With reference to the second aspect, in a first possible implementation manner of the second aspect, the processing, according to the SFP element, the service flow including the SFP ID further includes:

sending the service flow to the network service function instance corresponding to the SFP element for processing.

With reference to the first possible implementation manner of the second aspect, in a second possible implementation manner of the second aspect, the selecting a network service function instance for the SFP element that belongs to a service function service flow type, to process the service flow includes:

selecting a network service function instance whose load meets a preset condition for the SFP element that belongs to the service function service flow type, to process the service flow.

With reference to the second possible implementation manner of the second aspect, in a third possible implementation manner of the second aspect, the selecting a network service function instance whose load meets a preset condition for the SFP element that belongs to the service function service flow type, to process the service flow includes:

in network service function instances corresponding to SFP elements that belong to the service function type, selecting the network service function instance whose load meets the preset condition for the SFP element that belongs to the service function service flow type, to process the service flow.

With reference to the second or the third possible implementation manner of the second aspect, in a fourth possible implementation manner of the second aspect, the selecting a network service function instance whose load meets a preset condition is specifically:

selecting a network service function instance whose load is less than a threshold, or selecting a network service function instance whose load meets a service requirement.

According to a third aspect, an embodiment of the present application provides a controller, including:

a receiving module, configured to receive a service chain service request message for a service flow, where the service chain service request message includes a match rule corresponding to the service flow and a service chain SFC required by the service flow, and the service chain includes multiple sequentially arranged network service functions SFs;

a processing module, configured to: separately generate, according to the multiple SFs, corresponding SFP elements used to form a service chain instance SFP corresponding to the SFC, and allocate a corresponding identifier SFP ID to the generated SFP, where if it is determined and learned that the multiple SFs include a stateless SF, an SFP element corresponding to the stateless SF is an element of a service function type; and a sending module, configured to send the SFP and the SFP ID to each service forwarding device SFF, so that the SFF processes, according to the SFP element, a service flow including the SFP ID, where that the SFF processes, according to the SFP element, the service flow including the SFP ID includes: selecting, by the SFF, a network service function instance for the SFP element that belongs to the service function type, to process the service flow.

With reference to the third aspect, in a first possible implementation manner of the third aspect, the processing module is further configured to:

if it is determined and learned that the multiple SFs include a stateful SF, select a network service function instance as an SFP element corresponding to the stateful SF.

With reference to the first possible implementation manner of the third aspect, in a second possible implementation manner of the third aspect, the selecting a network service function instance as an SFP element corresponding to the stateful SF includes:

selecting a network service function instance whose load meets a preset condition as the SFP element corresponding to the stateful SF.

With reference to the second possible implementation manner of the third aspect, in a third possible implementation manner of the third aspect, the selecting a network service function instance whose load meets a preset condition is specifically:

selecting a network service function instance whose load is less than a threshold, or selecting a network service function instance whose load meets a service requirement.

According to a fourth aspect, an embodiment of the present application provides a service forwarding device, including:

a receiving module, configured to receive a service chain instance SFP and a corresponding identifier SFP ID that are sent by a controller, where the SFP is generated by the controller according to a service chain SFC required by a service flow, the controller allocates the corresponding identifier SFP ID to the generated SFP, the SFP includes multiple SFP elements, and the SFP elements are separately generated by the controller according to multiple sequentially arranged network service functions SFs included in the SFC; and a processing module, configured to process, according to the SFP element, a service flow including the SFP ID, where the processing, according to the SFP element, a service flow including: selecting a network service function instance for the SFP element that belongs to a service function service flow type, to process the service flow.

With reference to the fourth aspect, in a first possible implementation manner of the fourth aspect, the processing module is further configured to:

send the service flow to the network service function instance corresponding to the SFP element for processing.

With reference to the first possible implementation manner of the fourth aspect, in a second possible implementation manner of the fourth aspect, the processing module is specifically configured to:

select a network service function instance whose load meets a preset condition for the SFP element that belongs to the service function service flow type, to process the service flow.

With reference to the second possible implementation manner of the fourth aspect, in a third possible implementation manner of the fourth aspect, the processing module is specifically configured to:

in network service function instances corresponding to SFP elements that belong to the service function type, select the network service function instance whose load meets the preset condition for the SFP element that belongs to the service function service flow type, to process the service flow.

With reference to the second or the third possible implementation manner of the fourth aspect, in a fourth possible implementation manner of the fourth aspect, the selecting a network service function instance whose load meets a preset condition is specifically:

selecting a network service function instance whose load is less than a threshold, or selecting a network service function instance whose load meets a service requirement.

According to a fifth aspect, an embodiment of the present application provides a controller, including:

a processor and a memory, where the memory stores an execution instruction, and when the controller runs, the processor communicates with the memory, and the processor executes the execution instruction, so that the controller performs the method according to the first aspect.

According to a sixth aspect, an embodiment of the present application provides a service forwarding device, including:

a processor and a memory, where the memory stores an execution instruction, and when the service forwarding device runs, the processor communicates with the memory, and the processor executes the execution instruction, so that the service forwarding device performs the method according to the second aspect.

According to the service flow processing method, the apparatus, and the device in the embodiments of the present application, SFs are classified, and in a process in which a controller generates a service chain instance SFP according to a service chain service request message, for a stateless SF, the controller does not select a specific SF instance for the SF, but sets an SFP element corresponding to the SF to an element of a service function type, where the service function type includes multiple SF instances having a same function and configuration, and the controller sends the SFP and an SFP ID to each SFF, so that the SFF processes, according to the SFP element, a service flow including the SFP ID, and the SFF selects a specific SF instance for the SFP element that belongs to the service function service flow type, to process the service flow, which can effectively reduce a quantity of SFPs and a quantity of SFP IDs used to uniquely identify the SFPs, reduce signaling overheads required by a controller to configure an SFP for an SFF, and reduce storage space of each SFF for storing configuration information.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

Figure 1:
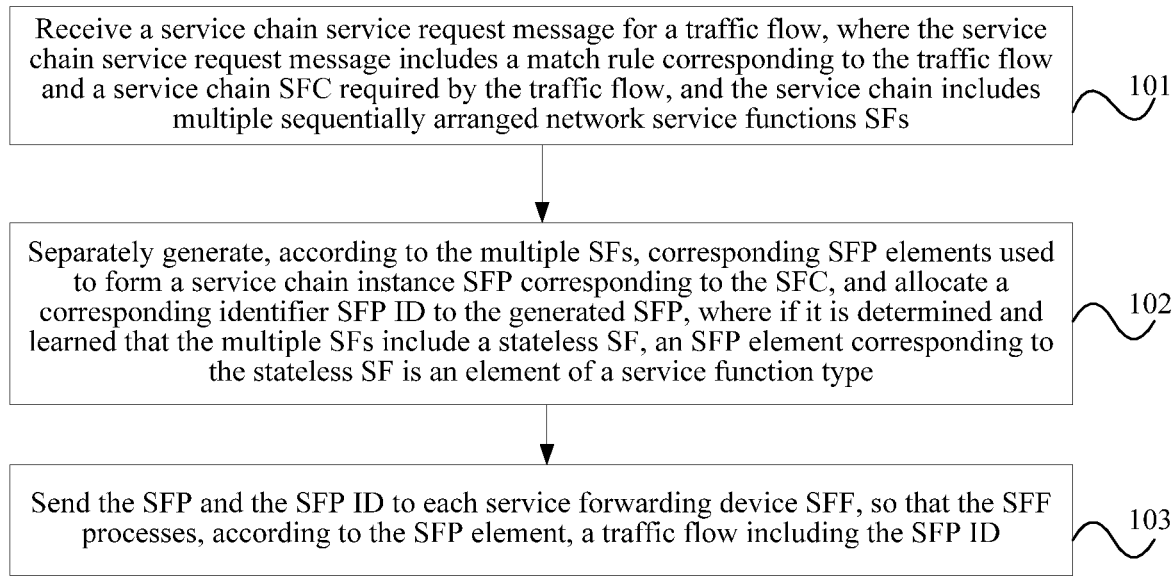
FIG. 1 is a flowchart of Embodiment 1 of a service flow processing method according to the present application.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

A network service function (SF) involved in the embodiments of the present application refers to a network function that can process a service flow, for example, a network address translation device (NAT), a firewall, or a TCP accelerator. Each network service function SF may have one or more specific network service function instances sfs, for example, a specific firewall device.

A service chain involved in the embodiments of the present application is a shortened term of a service function chain (SFC), multiple network service functions SFs are connected in a particular sequence to form a service chain, and the network service functions SFs in the SFC sequentially process a service flow according to a sequence of each SF in the SFC. For example, an SFC is a TCP accelerator→a firewall→a network address translation device (NAT), that is, the service flow needs to be first processed by the TCP accelerator, then processed by the firewall, and finally be processed by the NAT.

A service chain instance (SFP) involved in the embodiments of the present application is a specific instance of an SFC, includes a specific network service function instance sf of each SF in the SFC, and is formed by sfs corresponding to SFs according to a sequence of each SF in the SFC. For example, an sf corresponding to a TCP accelerator is sf1, an sf corresponding to a firewall is sf2, and an sf corresponding to an NAT is sf3, and a specific instance SFP of the foregoing SFC is sf1→sf2→sf3.

An SFP ID (SFP IDentifier) involved in the embodiments of the present application is an identifier used to uniquely identify one SFP, and each SFP has one SFP ID corresponding to the SFP to identify the SFP.

A service forwarding device involved in the embodiments of the present application is responsible for forwarding, according to an SFP ID, a service flow to each sf included in an SFP corresponding to the SFP ID, and each sf processes the service flow, where one SFF may be connected to multiple sfs.

A controller involved in the embodiments of the present application is an SFC controller, and is responsible for generating a service chain, configuring an SFF, and related management.

Network service functions SFs in the embodiments of the present application are classified into two types: (1) a stateful SF (stateful SF) and (2) a stateless SF.

Specifically, a stateful SF is a network service function saving state information of a service flow or context information of a service flow in a process of processing a service flow. For example, when translating a private network IPv4 address of the service flow into a public network IPv4 address, an NAT device stores a mapping relationship between the private network IPv4 address and the public network IPv4 address, so as to translate a public network IPv4 address of a returned service flow into a corresponding private network IPv4 address subsequently, that is, the NAT device is a stateful SF. A firewall may also be classified into a stateful SF and a stateless SF, and specifically, a firewall generally maintains context information for a detected service flow. In this case, when performing intrusion detection, the firewall detects multiple packets of the service flow and determines, according to the context information of the service flow, whether the service flow is trusted, that is, a firewall device maintains state information of a service flow. Therefore, in the present application, after a packet of a service flow passes through an instance sf corresponding to an SF, the sf also requires a subsequent packet of the service flow to pass through the sf, and a network service function SF to which a network service function instance sf having this feature belongs is defined as a stateful SF.

A stateless SF is a network service function that does not save state information of a service flow or context information of a service flow in a process of processing the service flow, for example, a device using a port number to perform a simple packet filtering function. Therefore, in the present application, after a packet of a service flow passes through an instance sf corresponding to an SF, a subsequent packet of the service flow is not required to pass through the sf, and a network service function SF to which a network service function instance sf having this feature belongs is defined as a stateless SF.

FIG. 1 is a flowchart of Embodiment 1 of a service flow processing method according to the present application. This embodiment is performed by a controller, which is specifically an SFC controller. As shown in FIG. 1, the method in this embodiment may include:

Step 101: Receive a service chain service request message for a service flow, where the service chain service request message includes a match rule corresponding to the service flow and a service chain SFC required by the service flow, and the service chain includes multiple sequentially arranged network service functions SFs.

The service chain service request message includes the match rule corresponding to the service flow, and the match rule may be specifically 5-tuple information, that is, a source IP address, a source port, a destination IP address, a destination port, and a transport layer protocol number of the service flow.

Step 102: Separately generate, according to the multiple SFs, corresponding SFP elements used to form a service chain instance SFP corresponding to the SFC, and allocate a corresponding identifier SFP ID to the generated SFP, where if it is determined and learned that the multiple SFs include a stateless SF, an SFP element corresponding to the stateless SF is an element of a service function type.

Specifically, the specific service chain instance SFP is generated according to the SFC required by the service flow in the service chain service request message for the service flow, the SFP includes multiple SFP elements corresponding to the SFs in the SFC, and if it is determined and learned that the SFs include the stateless SF, an element of the service function type is selected as the SFP element corresponding to the stateless SF, where the service function type may include multiple SF instances having a same function and configuration, and these SF instances can provide a same service to the service flow, that is, when it is determined and learned that the SFs in the SFC include the stateless SF, only a service function type of an SF instance through which the service flow needs to pass needs to be indicated, and a specific SF instance to be passed through does not need to be specified.

Step 103: Send the SFP and the SFP ID to each service forwarding device SFF, so that the SFF processes, according to the SFP element, a service flow including the SFP ID.

That the SFF processes, according to the SFP element, the service flow including the SFP ID may include: selecting, by the SFF, a network service function instance for the SFP element that belongs to the service function type, to process service flow.

Specifically, the SFP and the SFP ID corresponding to the SFP are sent to each SFF, and each SFF updates a service forwarding table maintained by the SFF.

Optionally, in step 102, in a process of separately generating, according to the multiple SFs, corresponding SFP elements used to form a service chain instance SFP corresponding to the SFC, if it is determined and learned that the multiple SFs include a stateful SF, a network service function instance is selected as an SFP element corresponding to the stateful SF, that is, a specific network service function instance sf in the SF is directly selected as the SFP element corresponding to the stateful SF.

Further, in step 103, that the SFF processes, according to the SFP element, the service flow including the SFP ID may also be: sending, by the SFF, the service flow to the network service function instance corresponding to the SFP element for processing. That is, when the SFP element is a network service function instance, the SFF directly sends the service flow to the network service function instance, and the network service function instance processes the service flow.

In the foregoing steps, the selecting a network service function instance as an SFP element corresponding to the stateful SF may be: selecting, according to load information of each network service function instance, a network service function instance whose load meets a preset condition as the SFP element corresponding to the stateful SF, where the preset condition may be that load is less than a threshold, or may be that load meets a service requirement, and may be flexibly set according to a requirement herein, and in a preferred manner, a network service function instance having minimum load may be selected.

The service flow arrives at the SFF, and the SFF forwards, according to the SFP element in the SFP corresponding to the service flow, the service flow to the corresponding SFP element by using each SFF, and the SFF selects the network service function instance whose load meets the preset condition for the SFP element that belongs to the service function service flow type, to process the service flow, where the preset condition may be flexibly set according to a requirement, and may be that load is less than a threshold, or may be that load meets a service requirement, and preferably, a network service function instance having minimum load may be selected.

In a process in which the SFF processes the service flow, the SFP element is of the service function type, and the SFF selects, from network service function instances corresponding to SFP elements that belong to the service function type, the network service function instance whose load meets the preset condition for the SFP element that belongs to the service function service flow type, to process the service flow, that is, in all the network service function instances corresponding to the SFP elements that belong to the service function type, selects a network service function instance according to a load status of each network service function instance.

Optionally, the network service function instance selected from all the network service function instances corresponding to the SFP elements that belong to the service function type is not directly connected to the SFF, the SFF forwards the service flow to an SFF directly connected to the network service function instance meeting the preset condition, and the SFF selects, from network service function instances that are connected to the SFF and that correspond to the SFP elements that belong to the service function type, the network service function instance whose load meets the preset condition for the SFP element that belongs to the service function service flow type, to process the service flow.

In this embodiment, a service chain service request message for a service flow is received, the service chain service request message includes a match rule corresponding to the service flow and a service chain SFC required by the service flow, corresponding SFP elements used to form a service chain instance SFP corresponding to the SFC are separately generated according to multiple SFs in the SFC, and a corresponding identifier SFP ID is allocated to the generated SFP, where if it is determined and learned that the multiple SFs include a stateless SF, the corresponding SFP element is an element of a service function type, the service function type includes multiple SF instances having a same function and configuration, that is, a controller does not specify a specific SF instance to be passed through for the stateless SF, and sends the SFP and the SFP ID to each SFF, so that the SFF processes, according to the SFP element, a service flow including the SFP ID, and the SFF selects a specific SF instance for the SFP element that belongs to the service function service flow type, to process the service flow. According to the technical solution in this embodiment, SFs are classified, and a specific instance is not selected for a stateless SF, which can effectively reduce a quantity of SFPs and a quantity of SFP IDs used to uniquely identify the SFPs, reduce signaling overheads required by a controller to configure the SFP for an SFF, and reduce storage space of each SFF for storing the configuration information.

Figure 2:
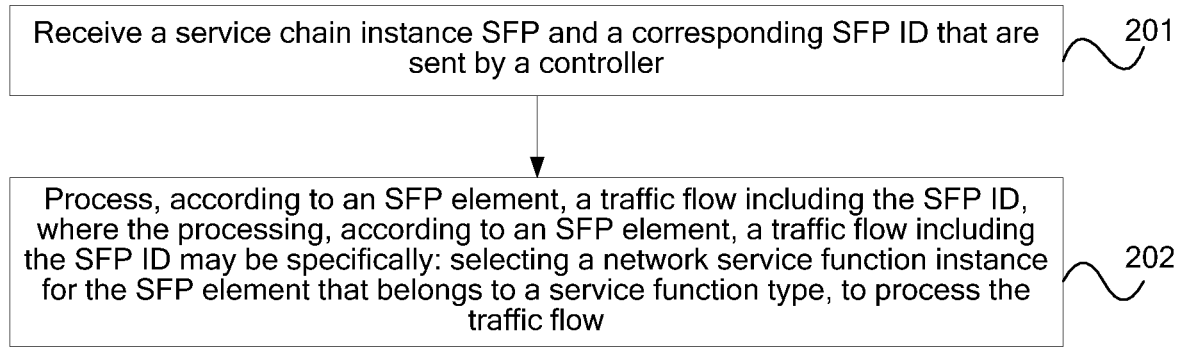
FIG. 2 is a flowchart of Embodiment 2 of a service flow processing method according to the present application.

FIG. 2 is a flowchart of Embodiment 2 of a service flow processing method according to the present application. This embodiment is performed by a service forwarding device SFF. As shown in FIG. 2, the method in this embodiment may include:

Step 201: Receive a service chain instance SFP and a corresponding identifier SFP ID that are sent by a controller.

The SFP is generated by the controller according to a service chain SFC required by the service flow, the controller allocates the corresponding identifier SFP ID to the generated SFP, the SFP includes multiple SFP elements, and the SFP elements are separately generated by the controller according to multiple sequentially arranged network service functions SFs included in the SFC.

Step 202: Process, according to an SFP element, a service flow including the SFP ID, where the processing, according to an SFP element, a service flow including the SFP ID may be specifically: selecting a network service function instance for the SFP element that belongs to a service function service flow type, to process the service flow.

That is, when the SFP element is of the service function type, the SFF selects a network service function instance for the SFP element, and the network service function instance processes the service flow.

Optionally, the processing, according to an SFP element, a service flow including the SFP ID may also be: sending the service flow to the network service function instance corresponding to the SFP element for processing, that is, when the SFP element is the network service function instance, directly sending, by the SFF, the service flow to the network service function instance for processing.

Further, when the SFF selects the network service function instance for the SFP element that belongs to the service function service flow type, to process the service flow, the SFF may select a network service function instance whose load meets a preset condition for the SFP element that belongs to the service function service flow type, to process the service flow, and the network service function instance whose load meets the preset condition may be specifically a network service function instance whose load is less than a threshold, or may be a network service function instance whose load meets a service requirement, and may be flexibly set according to a requirement herein, and preferably, a network service function instance having minimum load may be selected according to load information of each network service function instance to process the service flow.

In this embodiment, an SFF receives a service chain instance SFP and a corresponding identifier SFP ID that are sent by a controller, and processes, according to an SFP element, a service flow including the SFP ID, where the SFF selects a network service function instance for the SFP element that belongs to a service function service flow type, to process the service flow, that is, in the SFP that is sent by the controller and that is received by the SFF, the SFP includes the SFP element that belongs to the service function type, that is, when an SF is a stateless SF, in a process of generating the SFP, the controller does not specify a specific SF instance for the stateless SF, but sets only a service function type, and the SFF selects a specific SF instance for the SFP element that belongs to the service function type. Therefore, in a process in which the SFF receives the SFP and the corresponding SFP ID that are sent by the controller, the SFP does not include the SFP element, which belongs to the specific SF instance, of the service function type, thereby effectively reducing a quantity of SFPs received by an SFF and a quantity of SFP IDs that correspond to the SFPs, and effectively reducing storage space for storing the foregoing information.

Figure 3:
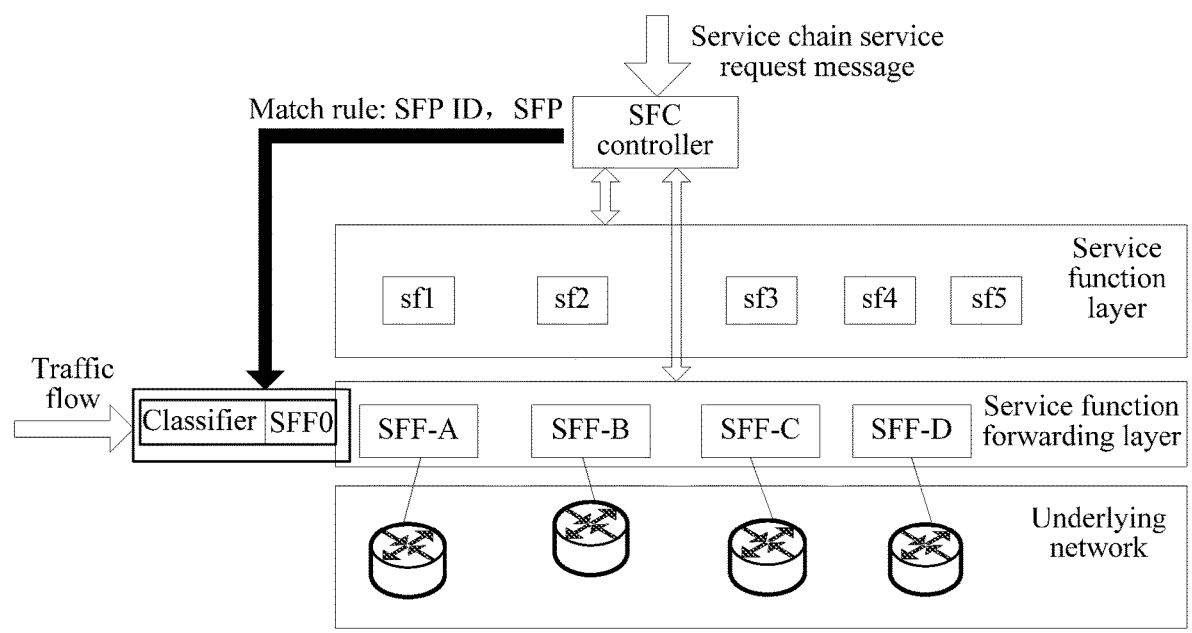
FIG. 3 is a diagram of a network architecture that implements a service function chain function according to the present application.
Figure 4:
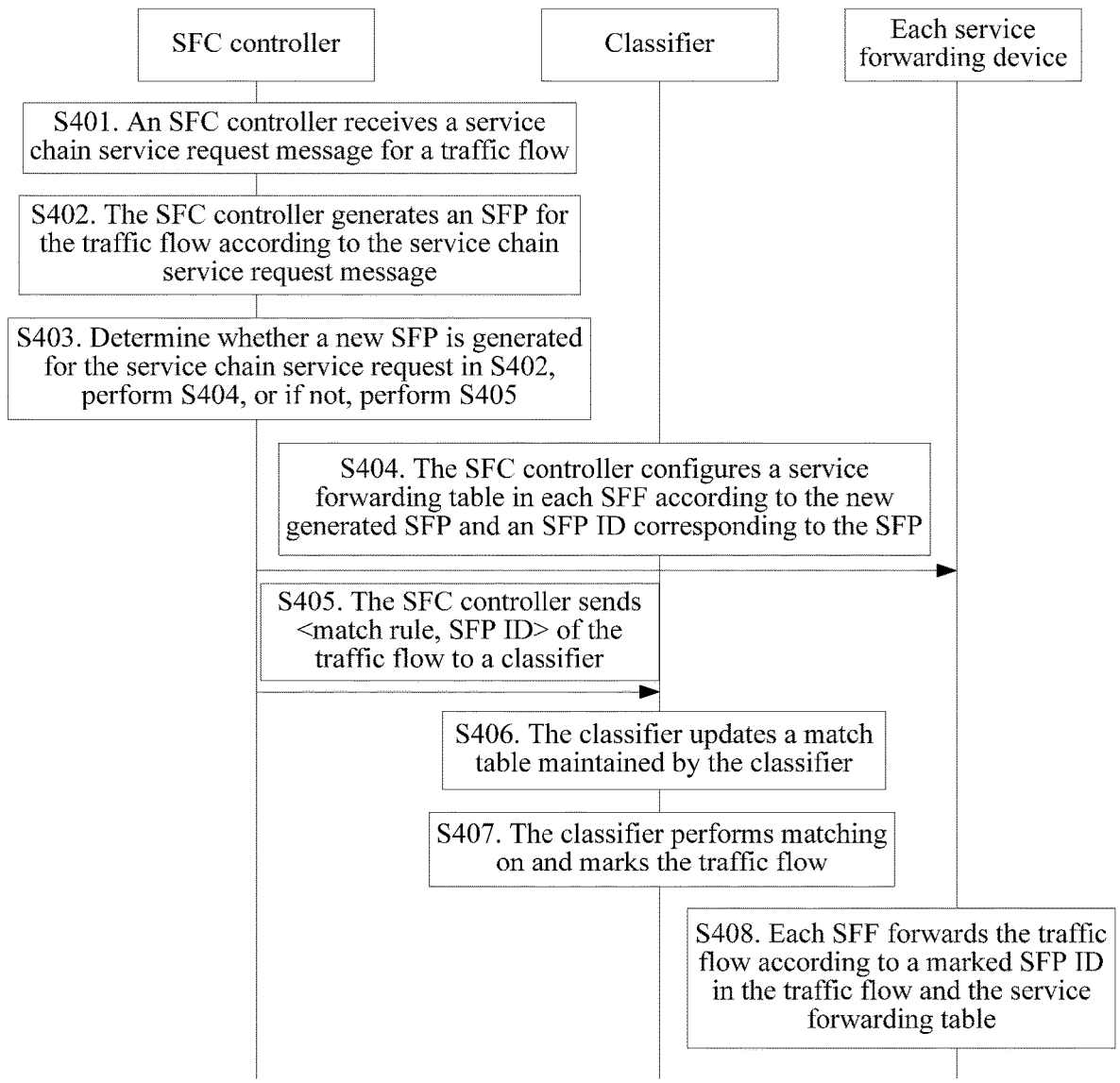
FIG. 4 is a signaling flowchart of Embodiment 3 of a service flow processing method according to the present application.
Figure 5:
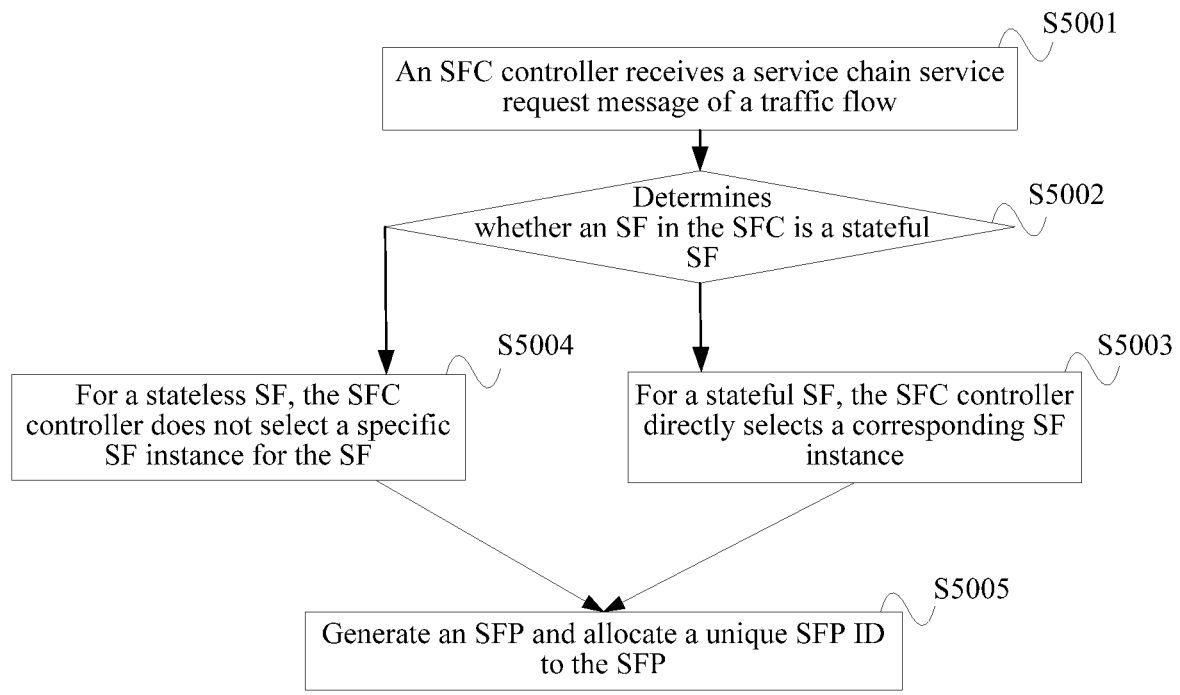
FIG. 5 is a flowchart of generating, by an SFC controller, an SFP in a service flow processing method according to the present application.

The technical solutions in the method embodiments shown in FIG. 1 and FIG. 2 are described below in detail by using a specific embodiment. FIG. 3 is a diagram of a network architecture that implements a service function chain function according to the present application, FIG. 4 is a signaling flowchart of Embodiment 3 of a service flow processing method according to the present application, the embodiment shown in FIG. 4 implements the service flow processing method by using the network architecture shown in FIG. 3 as an implementation scenario, and FIG. 5 is a flowchart of generating, by an SFC controller, an SFP in a service flow processing method according to the present application.

As shown in FIG. 3, the network architecture mainly includes main function entities including: an SFC controller, various SF instances sfs (that is, a specific instance of an SF, for example, a specific firewall device sf1), a classifier, a service forwarding device (SFF), and an underlying network forwarding device (for example, a layer 3 router or a layer 2 exchange). The embodiment shown in FIG. 4 is implemented based on the network architecture shown in FIG. 3, and as shown in FIG. 4, the method in this embodiment may include:

S401: An SFC controller receives a service chain service request message for a service flow.

The service chain service request message includes a match rule corresponding to the service flow and a service chain SFC required by the service flow, and the SFC includes multiple sequentially arranged SFs.

S402: The SFC controller generates an SFP for the service flow according to the service chain service request message.

According to the SFC in the received service chain service request message, where the SFC includes multiple SFs, the SFC controller separately generates, according to the multiple SFs, corresponding SFP elements used to form a service chain instance SFP corresponding to the SFC, the SFP elements sequentially form the SFP corresponding to the SFC. Specifically, a specific implementation process of S402 is shown in FIG. 5, and specific steps of S402 may include:

S5001: An SFC controller receives a service chain service request message for a service flow.

S5002: The SFC controller determines whether an SF in the SFC is a stateful SF (stateful SF), and if yes, perform S5003, or if not, perform S5004.

S5003: For a stateful SF (stateful SF), the SFC controller directly selects a corresponding SF instance.

If the SF is a stateful SF, the SF has multiple instances sfs, and the SFC controller may select an instance having minimum load from the multiple sfs, or may select an sf that can meet a service flow requirement in a service chain request and that does not need to be an sf having minimum load. The SF instance indicates a specific SF instance through which the service flow needs to pass.

S5004: For a stateless SF (stateless SF), the SFC controller does not select a specific SF instance for the SF.

If the SF is a stateless SF, the SFC controller does not specify the specific SF instance for the SF, but sets only an SF type in an SFP. The SF type may include multiple SF instances. The SF type indicates a type of an SF instance through which the service flow needs to pass, but does not specify a specific SF instance to be passed through, SF instances of a same type refer to SF instances that can provide a same service to the service flow, and generally, these SF instances of the same type have a same function and configuration.

S5005: Generate an SFP and allocate a unique SFP ID to the SFP.

After the SFP is generated according to the service chain service request message, if a same available SFP already exists, the SFC controller may select the SFP that already exists for the service flow, does not need to generate a new SFP, and uses an SFP ID corresponding to the existing SFP, or if a same available SFP does not exist, the SFC controller generates a new SFP according to the foregoing step, and allocates a new SFP ID to the SFP.

A manner of generating an SFP in S5001 to S5005 is described by using an example. Assuming that the service chain SFC in the service chain request for the service flow is SF1→SF2→SF3, where the SF2 is a stateless SF, the SF1 and the SF2 are stateful SFs, a specific instance of the SF1 is sf1, and a specific instance of the SF3 is sf3, the SFP generated by the SFC controller is sf1→SF2→sf3, where the SF2 is of an SF type.

S403: Determine whether a new SFP is generated for the service chain service request message in S402, perform S404, or if not, perform S405.

The SFC controller determines whether a new SFP is generated.

S404: The SFC controller configures a service forwarding table in each SFF according to the new generated SFP and an SFP ID corresponding to the SFP.

When the SFC controller generates a new SFP and an SFP ID for the service chain service request message, because there is no forwarding information corresponding to the SFP ID in the service forwarding table in each SFF, the SFC controller needs to update the service forwarding table in each SFF, where each SFF maintains a service forwarding table used to forward a packet, and the SFF is responsible for forwarding the service flow to a specific SF instance according to the SFP ID carried in the service flow, so that the SF instance processes the service flow. When the SFC controller generates a new SFP and an SFP ID corresponding to the SFP, the SFC controller configures the information in the SFF, and the SFC controller further configures, in the service forwarding table of the SFF, load information of each SF instance that belongs to the SF type in the service forwarding table maintained by the SFF. The SFF updates, according to the foregoing information sent by the SFC controller, the service forwarding table maintained by the SFF.

A specific form of the service forwarding table maintained by the SFF may be shown in Table 2. A service forwarding table of a service forwarding device SFF-X is used as an example for description. An SFP corresponding to an SDP ID 1 is sf1→SF2→sf3, the sf1 and the sf3 are SF instances, the SF2 is of an SF type, SF instances specifically included in the SF2 include an sf21, an sf22, an sf23, and an sf24, a locator refers to location information of an SF instance, and forms of the locator may be classified into two types: (1) if an SF instance is connected to the SFF, the locator is an interface of the SFF connected to the SF instance; (2) if an SF instance is not connected to the SFF, for example, is located in an SFF of a next hop, and the locator may be a network location of the SFF in which the SF instance is located, for example, an IP address of the SFF. Load information (load) of each SF instance of the SF type is further maintained in the service forwarding table. The SFF determines a forwarding path of the service flow by using the SFP ID, and carries an index value in the service flow, where the index value is used to indicate a sequential number of an SF instance that is currently processed in the SFP.

TABLE 2

Service forwarding table maintained by
the service forwarding device SFF-X
SFF-X SFP

| SFP ID 1 | sf1→SF2→sf3 | |
|---|---|---|
| SFF-X FT | sf1, locator | |
| | sf3, locator | |
| | SF2 | sf21, locator, load |
| | | sf22, locator, load |
| | | sf23, locator, load |
| | | sf24, locator, load |

S405: The SFC controller sends <match rule, SFP ID> of the service flow to a classifier.

After the SFP is generated according to the service chain service request message, if a same available SFP already exists, the SFC controller may select the existing SFP for the service flow, and does not need to generate a new SFP and an SFP ID corresponding to the SFP, but only needs to add the match rule of the service flow to a match rule of the SFP ID, and updates a <match rule, SFP ID> entry in the classifier (that is, updates a match table in the classifier).

However, if a same available SFP does not exist, the SFC controller generates, according to the foregoing step, a new SFP and an SFP ID corresponding to the SFP, and updates a <match rule, SFP ID> entry in the classifier (that is, updates a match table in the classifier).

S406: The classifier updates a match table maintained by the classifier.

The classifier maintains a match table, as shown in Table 3, an SFP ID and all match rule information corresponding to the SFP ID (that is, there may be a case in which multiple service flows uses a same SFP, and one SFP ID may correspond to multiple match rules) are maintained in the match table, and the classifier is responsible for marking the SFP ID in the service flow according to the match rule of the service flow and the match table, that is, acquires the SFP ID corresponding to the match rule from the match table according to the match rule of the service flow, to add an SFC forwarding packet header (SFP ID) to the service flow.

TABLE 3

Match table examples in the classifier

| SFP ID 1 | match rule 1 |
|---|---|
| | match rule 2 |
| | match rule 3 |
| SFP ID 2 | match rule 4 |
| | match rule 5 |
| . . . | . . . |
| SFP ID n | match rule n |

After the SFP is generated according to the service chain service request message for the service flow, if a same available SFP already exists, the classifier only needs to add the match rule of the service flow to the match rule of the SFP ID.

However, if a same available SFP does not exists, the SFC controller generates, according to the foregoing step, a new SFP and an SFP ID corresponding to the SFP, the classifier adds the new SFP ID to the match table, and adds the match rule of the service flow to a match rule to which the new SFP ID is added in the match table.

S407: The classifier performs matching on and marks the service flow.

When the service flow enters an SFC network through the classifier, the classifier performs matching between the match rule of the service flow and a match rule in the match table, and after the service flow successfully matches a match rule in the match table, the classifier marks an SFP ID corresponding to the match rule in the service flow. The marked service flow is sent an SFFO integrated with a function of the classifier, and then is forwarded to another SFF-X (for example, an SFF-A or an SFF-B) through the SFFO, and the SFF-X is responsible for forwarding the service flow to an SF instance according to the SFP ID.

S408: Each SFF forwards the service flow according to a marked SFP ID in the service flow and the service forwarding table.

It should be noted that, in the foregoing steps, signaling exchange between the SFC controller and each SFF in 404 and signaling exchange between the SFC controller and the classifier in S405 are not limited by a time sequence.

In this embodiment, in a process of generating an SFP for a service flow according to a service chain request message of the service flow, multiple SFs in an SFC required by the service flow are classified into a stateful SF and a stateless SF, an SFC controller selects a specific SF instance for the stateful SF, and does not select a specific SF instance for the stateless SF, but sets an SFP element corresponding to the stateless SF to an SF type, and sends the generated SFP and an SFP ID to each SFF, each SFF updates a service forwarding table maintained by the SFF, and forwards the service flow according to the updated service forwarding table, and a corresponding SF instance processes the service flow, that is, in this embodiment, the SFC controller performs load balancing control on the stateful SF (the SFC controller selects, according to load information of each SF instance, a specific SF instance for an SF that is a stateful SF), and load balancing control on the stateless SF is performed by a service forwarding device (the SFC controller does not select a specific SF instance for the SF that is a stateless SF). Therefore, compared with the prior art, this embodiment effectively reduces a quantity of SFPs generated by an SFC controller according to a service chain service request message and a quantity of corresponding SFP IDs, thereby effectively reducing signaling overheads required by the SFC controller to configure an SFP for each SFF, and accordingly, reducing service forwarding table entries that need to be maintained by each SFF, and reducing storage space of each SFF; and a decrease in forwarding entries in the SFF can improve forwarding efficiency. According to the technical solution described in this embodiment of the present application, assuming that there are M stateless SFs in a network, a quantity of generated SFP IDs is only 1/M of a quantity of SFP IDs in the prior art, and accordingly, a quantity of forwarding entries that need to be stored in an SFF is only 1/M of a quantity of forwarding entries in the prior art.

Figure 6:
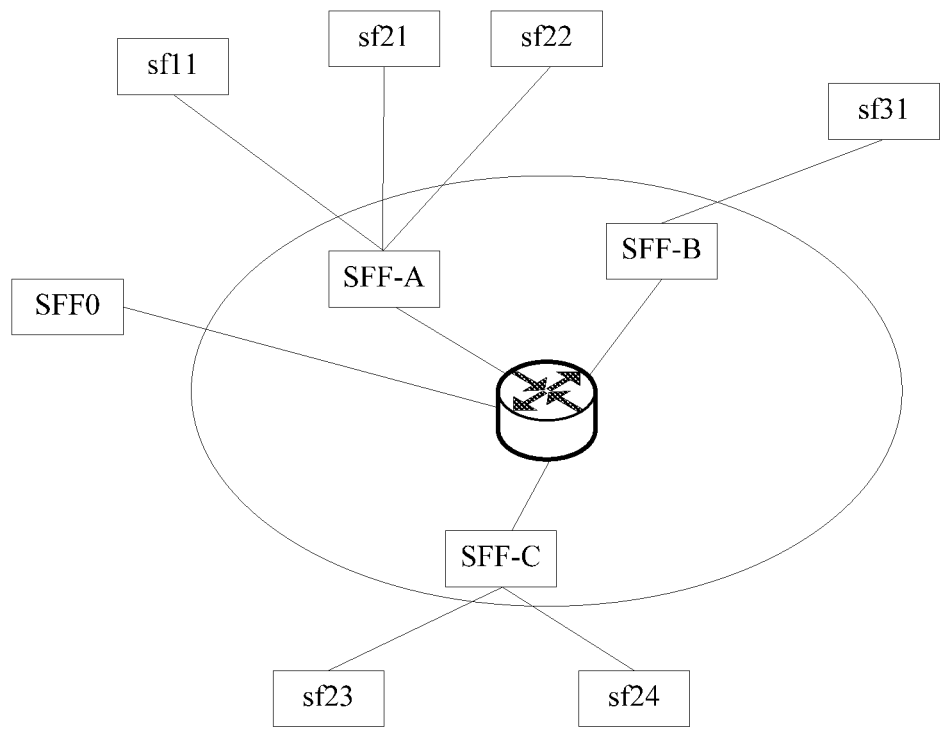
FIG. 6 is an exemplary schematic diagram of a connection between each SFF and an SF instance in a service flow processing method according to the present application.

How the SFF forwards the service flow in S408 in the foregoing embodiment is specifically described below by using a specific embodiment. FIG. 6 is an exemplary schematic diagram of a connection between each SFF and an SF instance in a service flow processing method according to the present application. Herein, an SFC in a service chain service request message is SF1→SF2→SF3 is used as an example for description. An SFC controller determines and learns that an SF1 and an SF3 are stateful SFs, an SF2 is a stateless SF, an SFP generated by the SFC controller for the service chain service request message is sf11→SF2→sf31, and an SFP ID is 1. Assuming that a connection status of each SFF and each SF instance is shown in FIG. 6, the connection status of each SFF and the SF instance is drawn herein only for exemplary description. Each SFF is specifically an SFF-A, an SFF-B, and an SFF-C, an sf11 and an sf31 are SF instances, the SF2 is of an SF type, and includes four specific instances: an sf21, an sf22, an sf23, and an sf24. In this embodiment, a service forwarding table maintained by each SFF is specifically Table 4, where load refers to load information of an SF instance, and the load information may be acquired from the SFC controller.

TABLE 4

Service forwarding table maintained by each SFF

| SFFO SFP | | |
|---|---|---|
| 1: | sf11 | |
| SFFO FT: | sf11, locator | |

| SFF-B SFP | | |
|---|---|---|
| 1: | sf11→SF2→sf31 | |
| SFF-B FT: | sf31, locator | |

| SFF-A SFP | | |
|---|---|---|
| 1: | sf11→SF2→sf31 | |
| SFF-A FT: | sf11, locator | |
| | sf31, locator | |
| | SF2 | sf21, locator, load |
| | | sf22, locator, load |
| | | sf23, locator, load |
| | | sf24, locator, load |

TABLE 4-continued

Service forwarding table maintained by each SFF

| SFF-C SFP | | |
|---|---|---|
| 1: | sf11→SF2→sf31 | |
| SFF-C FT: | sf31, locator | |
| | SF2 | sf23, locator, load |
| | | sf24, locator, load |

In the foregoing implementation scenario, a specific forwarding process of each SFF is as follows:

Step a: A classifier acquires, according to a match rule of a service flow, an SFP ID corresponding to the match rule from a match table, marks the SFP ID in a packet of the service flow, and sets an index to 0.

Step b: After an SFFO receives the packet of the service flow carrying the SFP ID from the classifier, a first hop of an SFP acquired according to the SFP ID is an sf11, so that the service flow is forwarded to a location of an sf11; in this case, a locator of the sf11 is an IP address of an SFF-A.

Step c: After receiving the packet of the service flow, the SFF-A determines, according to the SFP ID and the index value in the packet of the service flow, that the packet of the service flow needs to be forwarded to the sf11 for processing, so that the SFF-A sends the packet of the service flow to the sf11, and after the sf11 processes the packet of the service flow completely, the index is increased by 1 and the packet of the service flow is sent to the SFF-A.

Step d: After receiving the packet of the service flow returned by the sf11, the SFF-A determines, according to the SFP ID and the index value in this case, that the packet of the service flow is to be processed by an SF2, where because the SF2 recorded in a service forwarding table of the SFF-A is of an SF type, the SFF-A selects an SF2 instance having low load, and sends the packet of the service flow to the SF instance, and assuming that an sf23 herein is an SF instance having minimum load, a locator of the sf23 here is an IP address of an SFF-C.

Step e: After receiving the packet of the service flow, the SFF-C determines, according to the SFP ID and the index value in the packet of the service flow, that the packet of the service flow needs to be forwarded to the sf23 for processing, so that the SFF-C sends the packet of the service flow to the sf23, and after sf23 processes the packet of the service flow completely, the index is increased by 1 and the packet of the service flow is sent to the SFF-C.

Step f: After receiving the packet of the service flow returned by the sf23, the SFF-C determines, according to the SFP ID and the index value in this case, that the packet of the service flow is to be processed by an sf31, so that the SFF-C sends the packet of the service flow to the sf31, and a locator of the sf31 herein is an IP address of an SFF-B.

Step g: After receiving the packet of the service flow, the SFF-B determines, according to the SFP ID and the index value in the packet of the service flow in this case, that the packet of the service flow needs to be forwarded to the sf31 for processing, so that the SFF-B sends the packet of the service flow to the sf31, after processing the packet of the service flow completely, the sf31 returns service flow data to the SFF-B, and in this case, the packet of the service flow passes through SFP elements in all the SFPs.

It may be learned from the description of the steps above that, SFP elements in an SFP in the present application may be of an SF type, for these SFP elements, an SFF needs to select a specific SF instance, and a forwarding action of the SFF may specifically include two manners:

Manner 1: If an SFP element is of an SF type, the SFF determines an SF instance corresponding to the SF type, and a determining method is based on a load status of each SF instance of the SF type. If an SFP element to which the SFF is to forward a packet is connected to the SFF, the SFF only needs to select an sf having low load from the SF instance connected to the SFF to forward, or if an SFP element to which the SFF is to forward a packet is not connected to the SFF, the SFF selects an sf having low load from all SF instances maintained by the SFF to forward.

Manner 2: If an SFP element is an SF instance, the SFF performs forwarding according to an sf specified in the SFP.

Figure 7:
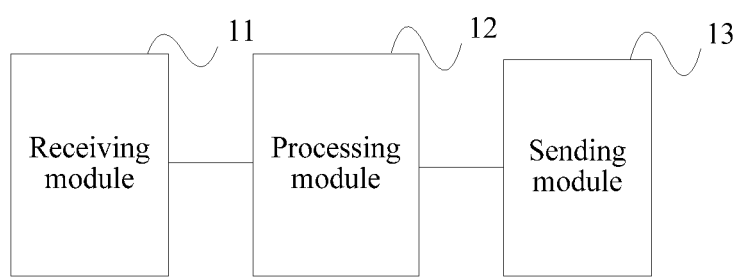
FIG. 7 is a schematic structural diagram of Embodiment 1 of a controller according to the present application.

FIG. 7 is a schematic structural diagram of Embodiment 1 of a controller according to the present application. As shown in FIG. 7, an apparatus in this embodiment may include: a receiving module 11, a processing module 12, and a sending module 13. The receiving module 11 is configured to receive a service chain service request message for a service flow, where the service chain service request message includes a match rule corresponding to the service flow and a service chain SFC required by the service flow, and the service chain includes multiple sequentially arranged network service functions SFs. The processing module 12 is configured to: separately generate, according to the multiple SFs, corresponding SFP elements used to form a service chain instance SFP corresponding to the SFC, and allocate a corresponding identifier SFP ID to the generated SFP, where if it is determined and learned that the multiple SFs include a stateless SF, a corresponding SFP element is an element of a service function type. The sending module 13 is configured to send the SFP and the SFP ID to each service forwarding device SFF, so that the SFF processes, according to the SFP element, the service flow including the SFP ID, where that the SFF processes, according to the SFP element, the service flow including the SFP ID includes: selecting, by the SFF, a network service function instance for the SFP element that belongs to the service function type, to process the service flow.

Optionally, the processing module 12 is further configured to: if it is determined and learned that the multiple SFs include a stateful SF, select a network service function instance as an SFP element corresponding to the stateful SF.

Further, the selecting a network service function instance as an SFP element corresponding to the stateful SF may specifically include: selecting a network service function instance whose load meets a preset condition as the SFP element corresponding to the stateful SF.

The selecting a network service function instance whose load meets a preset condition may be specifically: selecting a network service function instance whose load is less than a threshold, or selecting a network service function instance whose load meets a service requirement.

The apparatus in this embodiment may be configured to perform the technical solution in the method embodiment shown in FIG. 1, of which implementation principles and technical effects are similar, and details are not described herein again.

Figure 8:
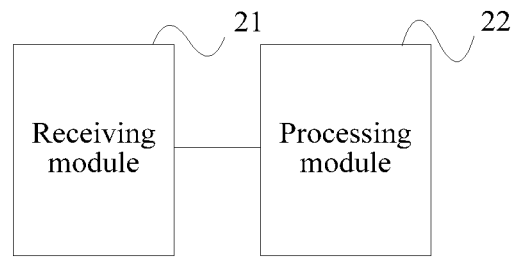
FIG. 8 is a schematic structural diagram of Embodiment 1 of a service forwarding device according to the present application.

FIG. 8 is a schematic structural diagram of Embodiment 1 of a service forwarding device according to the present application. As shown in FIG. 8, an apparatus in this embodiment may include: a receiving module 21 and a processing module 22. The receiving module 21 is configured to receive a service chain instance SFP and a corresponding identifier SFP ID that are sent by a controller, where the SFP is generated by the controller according to a service chain SFC required by a service flow, the controller allocates the corresponding identifier SFP ID to the generated SFP, the SFP includes multiple SFP elements, and the SFP elements are separately generated by the controller according to multiple sequentially arranged network service functions SFs included in the SFC. The processing module 22 is configured to process, according to the SFP element, the service flow including the SFP ID, where the processing, according to the SFP element, the service flow includes: selecting a network service function instance for the SFP element that belongs to a service function service flow type, to process the service flow.

Optionally, the processing module 22 is further configured to send the service flow to the network service function instance corresponding to the SFP element for processing.

Further, the selecting a network service function instance for the SFP element that belongs to a service function service flow type, to process the service flow may specifically include: selecting a network service function instance whose load meets a preset condition for the SFP element that belongs to the service function service flow type, to process the service flow.

Optionally, the processing module is specifically configured to: in network service function instances corresponding to SFP elements that belong to the service function type, select the network service function instance whose load meets the preset condition for the SFP element that belongs to the service function service flow type, to process the service flow.

That load meets a preset condition may be that the load is less than a threshold, or the load meets a service requirement. It may be understood that, another condition may also be selected, which is not limited herein.

The apparatus in this embodiment may be configured to perform the technical solution in the method embodiment shown in FIG. 2, of which implementation principles and technical effects are similar, and details are not described herein again.

Figure 9:
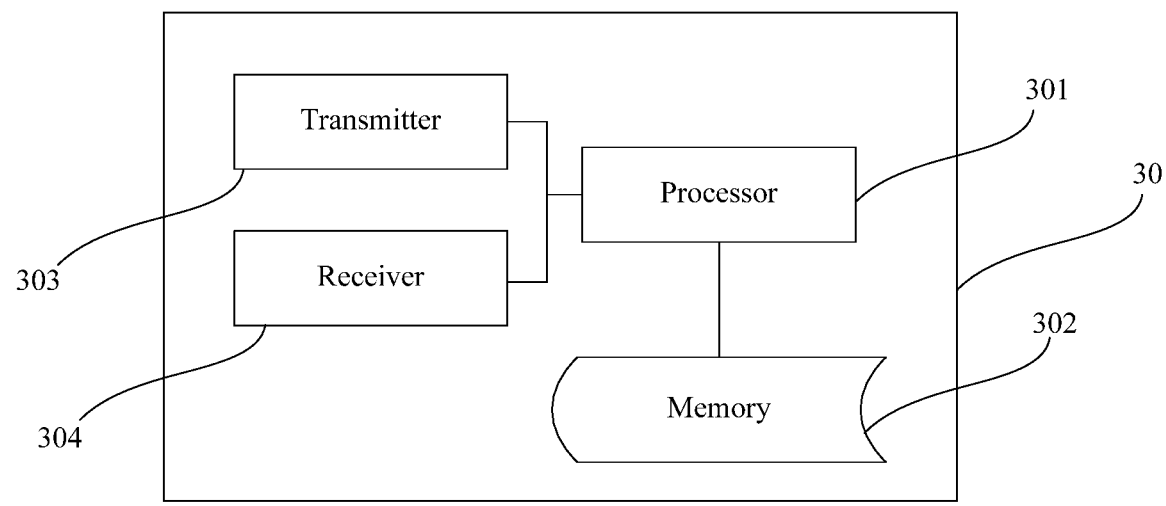
FIG. 9 is a schematic structural diagram of Embodiment 2 of a controller according to the present application.

FIG. 9 is a schematic structural diagram of Embodiment 2 of a controller 30 according to the present application. As shown in FIG. 9, the controller 30 provided in this embodiment includes a processor 301 and a memory 302. The controller 30 may further include a transmitter 303 and a receiver 304. The transmitter 303 and the receiver 304 may be connected to the processor 301. The transmitter 303 is configured to send data or information. The receiver 304 is configured to receive the data or information. The memory 302 stores an execution instruction. When the controller 30 runs, the processor 301 communicates with the memory 302, and the processor 301 invokes the execution instruction in the memory 302, to perform the technical solution in the method embodiment shown in FIG. 1, of which implementation principles and technical solutions are similar, and details are not described herein again.

Figure 10:
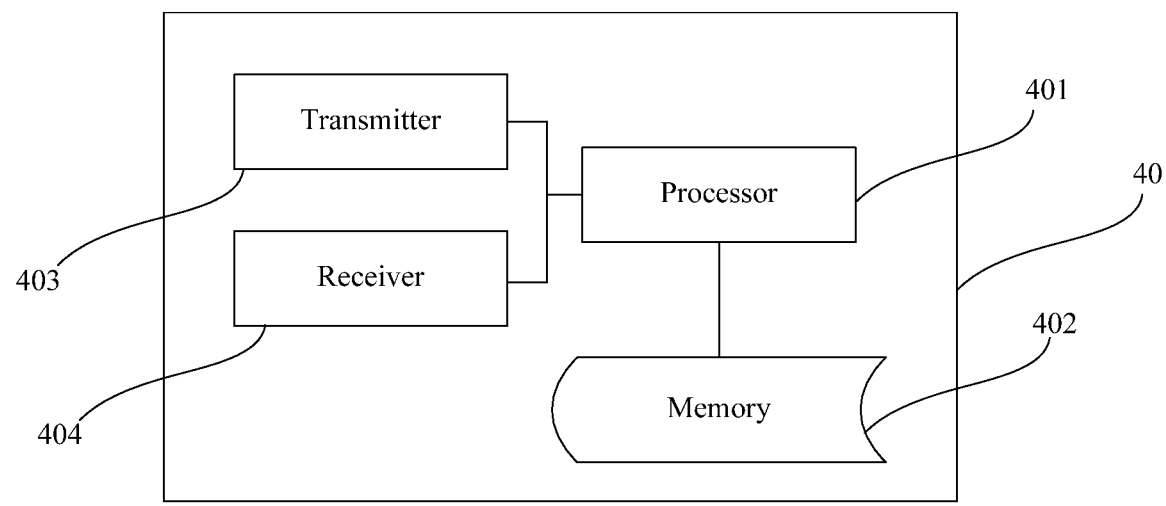
FIG. 10 is a schematic structural diagram of Embodiment 2 of a service forwarding device according to the present application.

FIG. 10 is a schematic structural diagram of Embodiment 2 of a service forwarding device 40 according to the present application. As shown in FIG. 10, the service forwarding device 40 provided in this embodiment includes a processor 401 and a memory 402. The service forwarding base station device 40 may further include a transmitter 403 and a receiver 404. The transmitter 403 and the receiver 404 may be connected to the processor 401. The transmitter 403 is configured to send data or information. The receiver 404 is configured to receive the data or the information. The memory 402 stores an execution instruction. When the service forwarding device 40 runs, the processor 401 communicates with the memory 402, and the processor 401 invokes the execution instruction in the memory 402, to perform the technical solution in the method embodiment shown in FIG.

2, of which implementation principles and technical solutions are similar, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A service flow processing method, comprising:
   receiving a service chain service request message for a service flow, wherein the service chain service request message comprises a match rule corresponding to the service flow and a service chain (SFC) required by the service flow, and the SFC comprises multiple sequentially arranged network service functions SFs;
   separately generating, according to the multiple SFs, corresponding SFP elements used to form a service chain instance SFP corresponding to the SFC, and allocating a corresponding identifier SFP ID to the generated SFP, wherein when it is determined and learned that the multiple SFs comprise a stateless SF, an SFP element corresponding to the stateless SF is an element of a service function type; and
   sending the SFP and the SFP ID to each service forwarding device SFF, so the SFF processes, according to the SFP element, a service flow comprising the SFP ID, wherein the SFF processing, according to the SFP element, of the service flow comprising the SFP ID comprises: selecting, by the SFF, a network service function instance for the SFP element that belongs to the service function type, to process the service flow.

2. The method according to claim 1, wherein the separately generating, according to the multiple SFs, corresponding SFP elements used to form a service chain instance SFP corresponding to the SFC further comprises:
   if it is determined and learned that the multiple SFs comprise a stateful SF, selecting a network service function instance as an SFP element corresponding to the stateful SF.

3. The method according to claim 2, wherein that the SFF processes, according to the SFP element, the service flow comprising the SFP ID further comprises:
   sending, by the service forwarding device SFF, the service flow to the network service function instance corresponding to the SFP element for processing.

4. The method according to claim 2, wherein the selecting a network service function instance as an SFP element corresponding to the stateful SF comprises:
   selecting a network service function instance whose load meets a preset condition as the SFP element corresponding to the stateful SF.

5. The method according to claim 4, wherein the selecting a network service function instance whose load meets a preset condition is specifically:
   selecting a network service function instance whose load is less than a threshold, or
   selecting a network service function instance whose load meets a service requirement.

6. The method according to claim 1, wherein the selecting, by the SFF, a network service function instance for the SFP element that belongs to the service function type, to process the service flow comprises:
   selecting, by the service forwarding device SFF, a network service function instance whose load meets a preset condition for the SFP element that belongs to the service function type, to process the service flow.

7. The method according to claim 6, wherein the selecting, by the SFF, a network service function instance whose load meets a preset condition for the SFP element that belongs to the service function type, to process the service flow comprises:
   in network service function instances corresponding to SFP elements that belong to the service function type, selecting, by the service forwarding device SFF, the network service function instance whose load meets the preset condition for the SFP element that belongs to the service function type, to process the service flow.

8. The method according to claim 7, wherein the selecting, by the SFF, the network service function instance whose load meets the preset condition for the SFP element that belongs to the service function type, to process the service flow further comprises:

in network service function instances that are directly connected to the SFF and that correspond to the SFP elements that belong to the service function type, selecting, by the SFF, the network service function instance whose load meets the preset condition for the SFP element that belongs to the service function type, to process the service flow.

9. A controller, comprising:

a receiver, configured to receive a service chain service request message for a service flow, wherein the service chain service request message comprises a match rule corresponding to the service flow and a service chain (SFC) required by the service flow, and the SFC comprises multiple sequentially arranged network service functions SFs;

a processor, configured to: separately generate, according to the multiple SFs, corresponding SFP elements used to form a service chain instance SFP corresponding to the SFC, and allocate a corresponding identifier SFP ID to the generated SFP, wherein when it is determined and learned that the multiple SFs comprise a stateless SF, an SFP element corresponding to the stateless SF is an element of a service function type; and a transmitter, configured to send the SFP and the SFP ID to each service forwarding device SFF, so the SFF processes, according to the SFP element, a service flow comprising the SFP ID, wherein the SFF processing, according to the SFP element, of the service flow comprising the SFP ID comprises: selecting, by the SFF, a network service function instance for the SFP element that belongs to the service function type, to process the service flow.

10. The controller according to claim 9, wherein the processor is further configured to:

if it is determined and learned that the multiple SFs comprise a stateful SF, select a network service function instance as an SFP element corresponding to the stateful SF.

11. The controller according to claim 10, wherein the processor is specifically configured to: select a network service function instance whose load meets a preset condition as the SFP element corresponding to the stateful SF.

12. The controller according to claim 11, wherein the selecting a network service function instance whose load meets a preset condition is specifically:

selecting a network service function instance whose load is less than a threshold, or selecting a network service function instance whose load meets a service requirement.

* * * * *